(12) United States Patent
Jonas et al.

(10) Patent No.: US 8,610,062 B2
(45) Date of Patent: Dec. 17, 2013

(54) APPARATUS AND METHOD FOR MULTI-SPECTRAL IMAGING

(75) Inventors: Matthew Jonas, Allen, TX (US); Todd E. Sessler, Goleta, CA (US); John F. McGee, III, Plano, TX (US); Alan R. Levy, Goleta, CA (US)

(73) Assignee: Raytheon Company, Waltham, MA (US)

( * ) Notice: Subject to any disclaimer, the term of this patent is extended or adjusted under 35 U.S.C. 154(b) by 140 days.

(21) Appl. No.: 13/070,766

(22) Filed: Mar. 24, 2011

(65) Prior Publication Data

US 2012/0241614 A1   Sep. 27, 2012

(51) Int. Cl.
*H04L 25/00* (2006.01)

(52) U.S. Cl.
USPC ........................................................ 250/332

(58) Field of Classification Search
USPC ........................................................ 250/332
See application file for complete search history.

(56) References Cited

U.S. PATENT DOCUMENTS

| | | | |
|---|---|---|---|
| 4,752,694 A | | 6/1988 | Hegel, Jr. et al. |
| 4,795,904 A | | 1/1989 | Richards |
| 4,975,864 A | | 12/1990 | Sendall et al. |
| 5,420,421 A | | 5/1995 | Lindgren et al. |
| 5,486,698 A | | 1/1996 | Hanson et al. |
| 5,587,784 A | * | 12/1996 | Pines et al. .................. 356/4.01 |
| 5,600,143 A | | 2/1997 | Roberts et al. |
| 5,631,466 A | | 5/1997 | Botti et al. |
| 5,756,999 A | | 5/1998 | Parrish et al. |
| 5,811,808 A | | 9/1998 | Cannata et al. |
| 6,064,066 A | | 5/2000 | Bevan et al. |
| 6,144,031 A | * | 11/2000 | Herring et al. ............... 250/352 |
| 6,420,695 B1 | * | 7/2002 | Grasdepot et al. ............ 250/226 |
| 6,465,785 B1 | | 10/2002 | McManus |
| 6,504,155 B1 | | 1/2003 | Ookawa |
| 6,690,013 B2 | | 2/2004 | McManus |
| 6,707,044 B2 | | 3/2004 | Lannestedt et al. |
| 6,791,610 B1 | * | 9/2004 | Butler et al. .................. 348/297 |
| 6,853,452 B1 | * | 2/2005 | Laufer .......................... 356/436 |
| 7,105,821 B1 | * | 9/2006 | Kennedy et al. ......... 250/339.07 |
| 7,119,337 B1 | * | 10/2006 | Johnson et al. .......... 250/339.13 |

(Continued)

FOREIGN PATENT DOCUMENTS

EP   2 012 100 A1   1/2009   ............... H04N 5/33

OTHER PUBLICATIONS

Riggan, Philip J., "FireMapper™: A Thermal-Imaging Radiometer for Wildfire Research and Operations", Aerospace Conference, Proceedings, IEEE, Jan. 1, 2003, pp. 1-12.

*Primary Examiner* — David Porta
*Assistant Examiner* — Taeho Jo
(74) *Attorney, Agent, or Firm* — Lando & Anastasi, LLP

(57) ABSTRACT

An apparatus for multi-spectral imaging includes a microbolometer array comprising a two-dimensional array of microbolometer detectors that are configured to respond to energy having a first range of wavelengths comprising a first plurality of spectral bands. The apparatus also includes a wideband window configured to allow energy having a second range of wavelengths to reach the microbolometer array. The second range of wavelengths comprises a second plurality of spectral bands. The apparatus additionally includes optics configured to focus the energy from a scene towards the microbolometer array. The apparatus further includes a processor configured to generate an output based on a response of the microbolometer array to energy having a third range of wavelengths comprising a third plurality of spectral bands. There is substantial overlap between the first, second, and third range of wavelengths and the first, second, and third plurality of spectral bands.

18 Claims, 2 Drawing Sheets

(56) References Cited

U.S. PATENT DOCUMENTS

| | | | |
|---|---|---|---|
| 7,135,679 B2* | 11/2006 | Roman et al. | 250/331 |
| 7,297,924 B2 | 11/2007 | DelTel et al. | |
| 7,348,562 B2 | 3/2008 | Irani | |
| 7,361,899 B2 | 4/2008 | Iida | |
| 7,617,022 B1* | 11/2009 | Wood et al. | 701/3 |
| 2002/0166967 A1 | 11/2002 | Kaufman | |
| 2003/0071216 A1* | 4/2003 | Rabolt et al. | 250/339.02 |
| 2005/0270528 A1* | 12/2005 | Geshwind et al. | 356/330 |
| 2006/0208193 A1* | 9/2006 | Bodkin | 250/353 |
| 2007/0018105 A1* | 1/2007 | Grimberg | 250/349 |
| 2007/0023661 A1* | 2/2007 | Wagner et al. | 250/338.1 |
| 2007/0176104 A1* | 8/2007 | Geneczko et al. | 250/338.1 |
| 2008/0067388 A1 | 3/2008 | Grimberg | |
| 2010/0176305 A1 | 7/2010 | Sessler | |
| 2011/0141286 A1* | 6/2011 | Vilain | 348/164 |

* cited by examiner

APPARATUS AND METHOD FOR MULTI-SPECTRAL IMAGING

TECHNICAL FIELD OF THE INVENTION

This invention relates in general to microbolometers and, more particularly, to apparatuses and methods for multi-spectral imaging.

BACKGROUND

A typical narrow band energy detector can accurately and efficiently detect and/or create images from energy radiating from a scene within a specific spectral band. For example, an infrared detector is able to create images from energy in the infrared spectral band. In order to improve the performance within the specific spectral band for which the detector is designed, the detector may include a narrowband window that rejects spectral bands outside of the specific targeted spectral band.

SUMMARY

From the foregoing, it may be appreciated that a need has arisen for a method and apparatus for multi-spectral imaging that includes a microbolometer array comprising a two-dimensional array of microbolometer detectors. The microbolometer array is configured to respond to energy having a first range of wavelengths comprising a first plurality of spectral bands. The apparatus also includes a wideband window configured to allow energy having a second range of wavelengths to reach the microbolometer array. The second range of wavelengths comprises a second plurality of spectral bands. The apparatus additionally includes optics that are configured to focus the energy from a scene through the wideband window and towards the microbolometer array. The apparatus further includes a processor that is configured to generate an output based on a response of the microbolometer array to energy having a third range of wavelengths comprising a third plurality of spectral bands. There is substantial overlap between the first, second, and third range of wavelengths and the first, second, and third plurality of spectral bands.

Technical advantages of particular embodiments may include creating images for energy over a wide range of spectral bands. Accordingly, a multi-spectral imaging apparatus may be able to identify a wider range of objects than a traditional narrow band energy detector. Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

A better understanding of particular embodiments will be realized from the detailed description which follows, taken in conjunction with the accompanying drawings, in which.

DETAILED DESCRIPTION OF THE DRAWINGS

Figure 1:
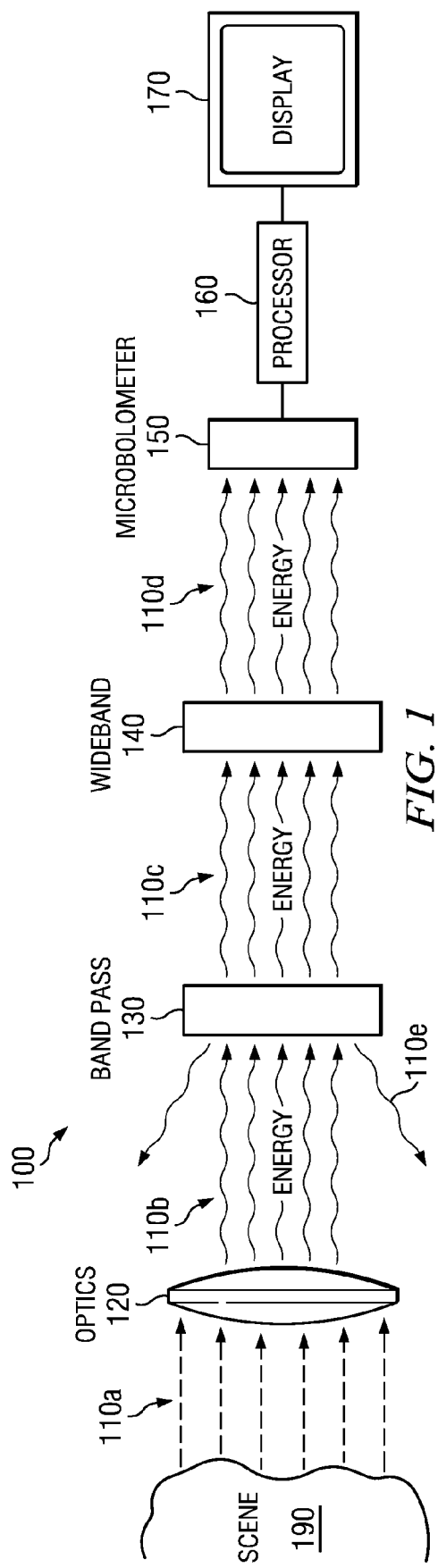
FIG. 1 is a block diagram of an apparatus configured to provide multi-spectral imaging of a scene, in accordance with particular embodiments.

With reference to FIG. 1, there is shown a block diagram of an apparatus configured to provide multi-spectral imaging of a scene, in accordance with particular embodiments. In the depicted embodiment, wideband detector 100 is aligned to observe energy 110a radiating from scene 190. Wideband detector 100 may be integrated in, coupled to, or comprise a weapon sight, night vision goggles, day/night/obscurants imaging devices, all-weather vehicle driving systems, situational awareness devices, surveillance and/or security sensors, or any other devices or systems for which it may be desirable to detect energy in more than one spectral band. Scene 190 may comprise any number of objects, environments, or other components which a user may wish to observe through wideband detector 100. Wideband detector 100 may be able to observe and detect the electromagnetic energy or spectral energy, generally referred to as energy herein, emitted from scene 190. As will be discussed in more detail below, the components of wideband detector 100 may focus, filter, measure, and process energy 110 in order to generate an image (e.g., a video image) for presentation on display 170.

Energy 110a from scene 190 may comprise energy having a wide range of wavelengths. The range of wave lengths may be sub-divided into spectral bands, each spectral band may comprise a sub-set of the wide range of wavelengths. For example, energy 110 may comprise energy in the visible spectrum (from approximately 0.380 to 0.75 micrometers), near infrared spectrum (from approximately 0.75 to 1.4 micrometers), short-wave infrared spectrum (from approximately 1.4 to 3 micrometers), mid-wave infrared spectrum (from approximately 3 to 8 micrometers), long-wave infrared spectrum (from approximately 8 to 15 micrometers), far-wave infrared spectrum (from approximately 15 to 1000 micrometers), etc. Energy 110a may be generated, emitted, reflected or otherwise emanate from scene 190 in an omnidirectional pattern. A range of wavelengths need not be contiguous.

Optics 120 may focus energy 110a radiated from scene 190 into energy 110b which is directed towards microbolometer array 150. The focused energy 110b may first pass through bandpass window 130 and wideband window 150 before reaching microbolometer array 150. Optics 120 may comprise any of a variety of different types of lenses and reflective surfaces (e.g., mirrors) configured to focus and direct energy 110a from scene 190 towards microbolometer array 150. In particular embodiments, optics 120 may comprise multiple optical paths through which a wide range of energy may be focused towards bandpass window 130 or wideband window 140. Each path may be configured or optimized for a particular spectral band or range of spectral bands. The different optical paths may be created and/or maintained through the use of various lenses, mirrors, and/or other reflective surfaces.

Focused energy 110b may pass through or be reflected by an optional or selectable bandpass window 130. Bandpass window 130 may be configured to block or reflect certain wavelengths (energy 110e) while allowing other wavelengths (energy 110c) to pass through. The resulting energy 110c may comprise a subset or narrower range of wavelengths. This may reduce the spectral range of energy that is ultimately able to reach microbolometer array 150.

As indicated above, bandpass window 130 may be an optional or selectable component along the path of energy 110 from scene 190 to microbolometer array 150, generally referred to as the energy path herein. For example, in certain embodiments, wideband detector 100 may not include bandpass window 130. As another example, bandpass window 130 may be selectable such that a user or processor 160 may cause bandpass window 130 to be inserted or removed from the energy path. For example, if bandpass window 130 is configured to pass infrared energy, a user who wants to see only infrared spectral energy may cause bandpass window 130 to be inserted in the energy path. In some embodiments, the user may be able to move, or select, bandpass window 130 mechanically. For example the user may slide a lever or turn a knob to insert or remove bandpass window 130. In particular embodiments, bandpass window 130 may be selected based on control signals from, for example, processor 160. The control signals may be based on user input and/or calculations or decisions made by processor 160.

In some embodiments, bandpass window 130 may comprise multiple different filters or bandpass windows. For example, bandpass window 130 may comprise one or more of a bandpass window configured to pass infrared energy, a bandpass window configured to pass near infrared energy, a bandpass window configured to pass visible light, a bandpass window configured to block infrared energy, a bandpass window configured to block near infrared energy, a bandpass window configured to block visible light, etc. In some embodiments, multiple bandpass windows 130 may be inserted into the energy path at the same time to further customize or narrow the range of energy that is able to reach microbolometer array 150. In some embodiments, the multiple bandpass windows of bandpass window 130 may be arranged in one or more filter wheels. In such an embodiment, bandpass window 130 may comprise several different materials configured to pass or block certain spectral bands or ranges of energy. The material may be arranged in a pinwheel type configuration that, when rotated or otherwise actuated, causes different materials to be inserted into the energy path.

Energy 110c may then pass through wideband window 140. In particular embodiments, wideband window 140 may be coupled to microbolometer array 150. For example, in certain embodiments, the individual micro bolometers of microbolometer array 150 may operate in a vacuum. Wideband window 140 may be used as the top surface that seals the vacuum around the individual microbolometer detectors of microbolometer array 150. Wideband window 140 may be configured to allow a broad range of energy to pass. The material used for wideband window 140 may be selected so as to minimize, reduce, or eliminate the amount of energy that is reflected or otherwise prevented from reaching microbolometer array 150. In particular embodiments, wideband window 140 may be made out of sapphire. Other materials, such as thallium bromoiodide (KRS-5) or zinc selenide (ZnSe), may be used for wideband window 140.

Microbolometer array 150 may convert energy 110d that has passed through wideband window 140 into electrical signals. The electrical signals may be processed and/or analyzed by processor 160. Microbolometer array 150 may comprises a two-dimensional array of individual microbolometer detectors. Each of the individual microbolometer detectors of microbolometer array 150 may be considered a different or separate pixel. A readout circuit coupled to the array of detectors is used to generate a plurality of electric signals based on the varying amount energy that reaches each individual microbolometer detector. The electrical signals may be compiled, processed and/or analyzed to generate an image that is presented on display 170.

When microbolometer array 150 is exposed to energy 110d, different microbolometers in microbolometer array 150 change temperature to varying degrees based on the portion of scene 190 to which they are exposed. The changes in temperature may cause changes in the resistivity of the microbolometer detectors. The readout circuitry of microbolometer array 150 may use this change in resistivity as the basis for the electrical signals from the individual microbolometer detectors of microbolometer array 150. In particular embodiments, the individual microbolometer detectors of microbolometer array 150 may comprise vanadium oxide.

The electrical signals from microbolometer array 150 may be received, processed, and/or interpreted by processor 160. For example, processor 160 may process the electrical signals to generate an image for presentation on display 170. As another example, processor 160 may process and/or interpret the received electrical signals to identify objects of interest. Identifying objects of interest may include for example, processor 160 examining the electrical signals to identify near infrared pointers. Near infrared pointers may be used to identify objects for guided weapons. As another example, processor 160 may be able to process the electrical signals from microbolometer array 150 in order to identify laser designator illumination or targeting spot. A laser designator may be created by an enemy attempting to mark or identify a particular object. Identifying a laser designator may trigger an alarm or other type of warning. As yet another example, processor 160 may be able to process the electrical signals from microbolometer array 150 in order to identify objects that are camouflaged. For example, certain objects may be camouflaged for a particular spectral band to hide the object from specific narrowband detectors. Because wideband detector 100 is able to detect energy in a number of different spectral bands, processor 160 may be able to identify the camouflaged object in a spectral band different than the specific spectral band for which the object is camouflaged. In some scenarios and/or embodiments, processor 160 may cycle through different bandpass windows 130 and compare the resulting images. A discrepancy in which an object appears in certain images from particular spectral ranges but not others may indicate that the object is being camouflaged.

The electrical signals received by processor 160 from microbolometer array 150 may be processed and sent to display 170 for presentation to a user. In certain embodiments, processor 160 may highlight or otherwise call attention to particular objects in the displayed image. The highlighted objects may be objects that have been identified by processor 160 as being objects of interest. For example, if processor 160 detects a near infrared pointer the displayed image on display 170 may exaggerate or otherwise call attention to the presence of the near infrared pointer.

Processor 160 may be a microprocessor, controller, or any other suitable computing device, resource, or combination of hardware, software and/or encoded logic operable to provide, either alone or in conjunction with other components, (e.g., memory) processing of the electrical signals received from microbolometer array 150. Such functionality may include generating video images for presentation on display 170 or identifying objects of interest from within scene 190. Additional examples and functionality provided, at least in part, by processor 160 are discussed herein.

In particular embodiments, processor 160 may include hardware for executing instructions, such as those making up a computer program. As an example and not by way of limitation, to execute instructions, processor 160 may retrieve (or fetch) instructions from an internal register, an internal cache, memory, or any other suitable tangible computer readable storage media; decode and execute them; and then write one or more results to an internal register, an internal cache, memory, or any other suitable tangible computer readable storage media.

In particular embodiments, processor 160 may include one or more internal caches for data, instructions, or addresses. This disclosure contemplates processor 160 including any suitable number of any suitable internal caches, where appropriate. As an example and not by way of limitation, processor 160 may include one or more instruction caches, one or more data caches, and one or more translation lookaside buffers (TLBs). Instructions in the instruction caches may be copies of instructions in memory or another tangible computer readable storage media and the instruction caches may speed up retrieval of those instructions by processor 160. Data in the data caches may be copies of data in memory or another tangible computer readable storage media for instructions executing at processor 160 to operate on; the results of previous instructions executed at processor 160 for access by subsequent instructions executing at processor 160, or for writing to memory or another tangible computer readable storage media); or other suitable data. The data caches may speed up read or write operations by processor 160. The TLBs may speed up virtual-address translations for processor 160. In particular embodiments, processor 160 may include one or more internal registers for data, instructions, or addresses. Depending on the embodiment, processor 160 may include any suitable number of any suitable internal registers, where appropriate. Where appropriate, processor 160 may include one or more arithmetic logic units (ALUs); one or digital signal processing units; be a multi-core processor; include one or more processors 160; or any other suitable processor. Processor 160 may also comprise a Field Programmable Gate Array, an Application Specific Integrated Circuit, or any other digital processing device or circuit.

Display 170 may be configured to receive video images from processor 160. The images may be based on energy 110d detected by microbolometer 150. In certain embodiments, display 170 may comprise a color monitor, TV, or other display apparatus. In certain embodiments, display 170 may be integrated with other equipment, such as a tactical display within a vehicle, in a gun sight, or any other place, device, or apparatus where it may be desirable to see multiple different spectral bands of energy emitted from scene 190.

The components of wideband detector 100 may be configured such that microbolometer array 150 may be exposed to a variety of different spectral bands of energy including, but not limited to, visible light, near infrared, short-wave infrared, mid-wave infrared and long-wave infrared. This may allow wideband detector 100 to be able to detect a wide variety of different objects including, but not limited to, near-infrared pointers, laser designator illumination, eyesafe laser range finders, short-wave infrared sky glow, mid-wave weapon fire and thermal detection, long wave thermal detection, camouflaged objects, etc. The wide spectral range in a single wideband detector 100 is different than traditional microbolometer detectors in which the system is optimized to detect a particular, narrower, spectral band.

Figure 2:
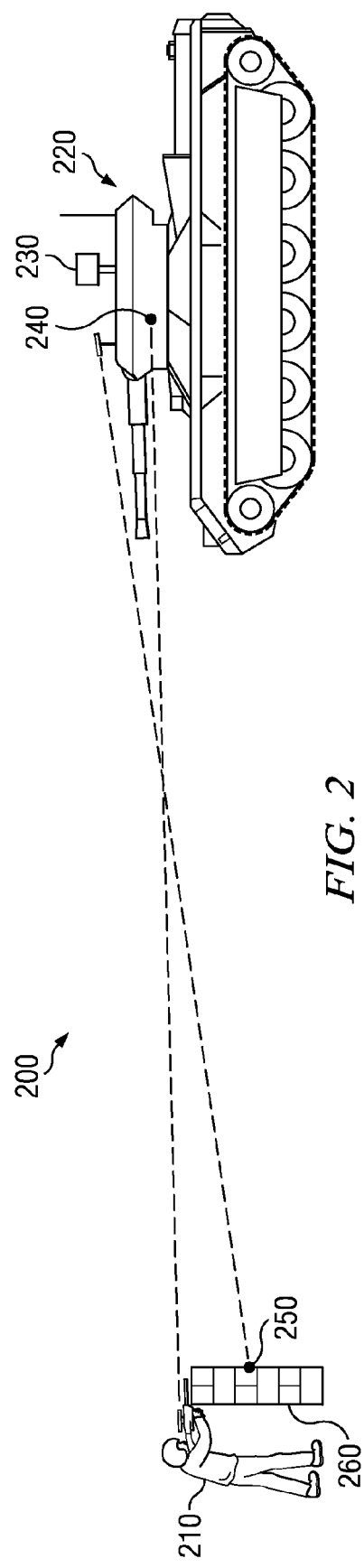
FIG. 2 is an example application of an apparatus configured to provide multi-spectral imaging, in accordance with particular embodiments.

FIG. 2 is an example application of an apparatus configured to provide multi-spectral imaging, in accordance with particular embodiments. Scene 200 depicted in FIG. 2 depicts an example scenario in which wideband detector 230 may be used in a field of operation. In scene 200, tank 220 is engaged with enemy 210. Wideband detector 230 is coupled to tank 220 and is providing tank 220 with multi-spectral imaging. In certain embodiments, wideband detector 230 may be part of a detector array housing any number of different detectors used by tank 220. In certain embodiments, wideband detector 230 may be similar to wideband detector 100.

In scene 200, tank 220 has generated a near infrared pointer 250 directed at wall 260. Near infrared pointer 250 may be used by a targeting system of tank 220 to target wall 260. For example, wideband detector 230 may observe a scene comprising enemy 210, wall 250 and near infrared pointer 250. Near infrared pointer 250 may be detected by a processor (e.g., processor 160 discussed above with respect to FIG. 1). This information may be provided to the targeting system and used to aim the shot fired by tank 220.

Wideband detector 230 may also be able to detect laser designator illumination 240. Depending on the embodiment and/or scenario, laser designator illumination may be detected along the surface of the object on which it is pointing or from its source. Accordingly, depending on the embodiments, wideband detector 230 may be ale to detect laser designator illumination 240 along the surface of tank 220 or from the device used by enemy 210 to generate laser designator illumination 240. Upon detecting laser designator illumination 240 an alert may be sounded within tank 220 alerting the crew of the possible threat.

In certain embodiments and/or scenarios, wideband detector 230 may be able to detect both near infrared pointer 250 and laser designator illumination 240 simultaneously. For example, wideband detector 230 may be operating without a bandpass window inserted into the energy path. This may allow wideband detector 230 to receive and process energy over a wide range of wavelengths and spectral bands, including the two different spectral bands used by near infrared pointer 250 and laser designator illumination 240. In some embodiments, wideband detector 230 may be configured to operate without bandpass window inserted in the energy path, and then when an object of interest is detected, wideband detector 230 may insert one or more bandpass windows into the energy path based on one or more characteristics of the identified object. This may reduce the spectral bands that are able to reach the microbolometer array and allow broadband detector to focus in on the spectral range associated with the identified object. The selected bandpass windows may vary over time as different objects of interest are identified or in order to better focus on a particular spectral band or bands. This may allow wideband detector 230 to detect a wide range of objects when operating in a wideband mode and to further discriminate the identified object by switching to the relevant spectral band.

Figure 3:
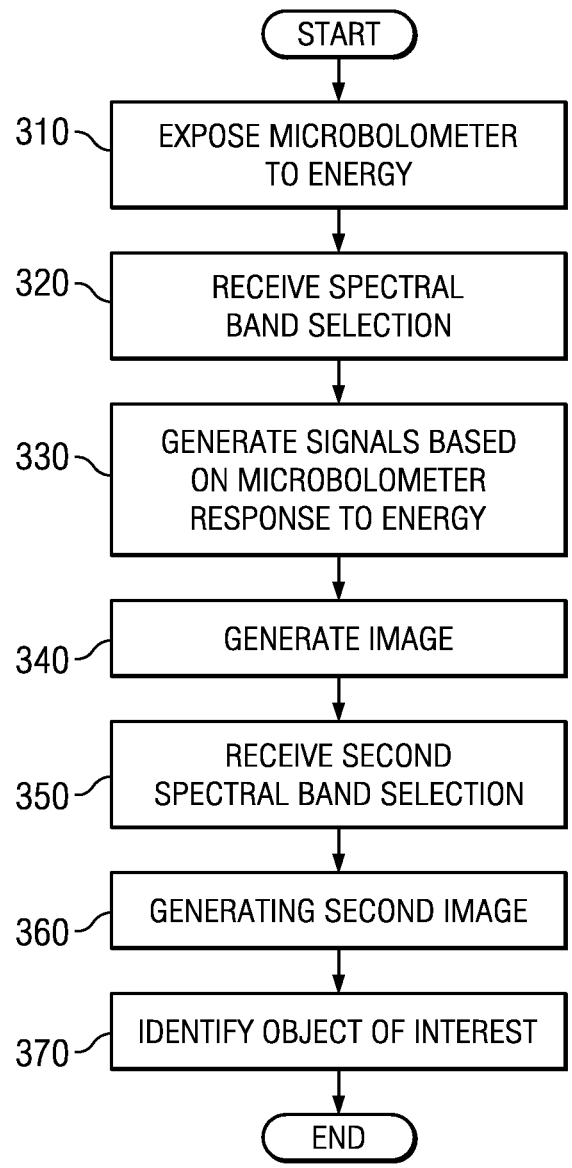
FIG. 3 is a method for providing multi-spectral imaging, in accordance with particular embodiments.

FIG. 3 is a method for providing multi-spectral imaging, in accordance with particular embodiments. The method begins at step 310 by exposing a microbolometer array to a wide range of energy (e.g., electromagnetic energy). The microbolometer array may comprise a two-dimensional array of individual microbolometer detectors. The individual microbolometer detectors of the two-dimensional array of microbolometer detectors may correspond to pixels that may be presented on a display (e.g., display 170 of FIG. 1). Depending on the scenario and/or user entered input, the microbolometer array may be exposed to energy having a first range of wavelengths. For example the received energy may cover a wide range of wavelengths from 0.38 to 1000 micrometers. The range of wavelengths may correspond to a plurality of different spectral bands. For example, the spectral bands may include visible wavelengths, near infrared wavelengths, short-wave infrared wavelengths, mid-wave infrared wavelengths, and long-wave infrared wavelengths. The first range of wavelengths need not be contiguous.

At step 320 a spectral band selection is received. The spectral band selection may identify one or more different spectral bands that are to be blocked or allowed to reach the microbolometer array. The selected spectral bands may comprise the full range of spectral bands detectable by the microbolometer array (e.g., from 0.38 to 1000 micrometers)

or a subset thereof. Depending on the embodiment and/or scenario, the spectral band selection may be made by a user physically manipulating a bandpass window (e.g., a filter wheel or other device used to insert one or more bandpass windows in the energy path). In certain embodiments, a processor may be used in inserting one or more bandpass windows into the energy path. For example, the processor may select one or more bandpass windows to be inserted into the energy path based on user input. As another example, the processor may select one or more bandpass windows to be inserted into the energy path based on information collected from the microbolometer array. For example, the processor may identify an object of interest in the output from the microbolometer array. Based on one or more characteristics of the identified object of interest, the processor may select one or more bandpass windows to be inserted into the energy path. The selected bandpass window may be inserted to narrow the spectral band of energy that the microbolometer array receives.

At step 330 the microbolometer array generates a signal in response to the energy received by the two-dimensional array of the microbolometer array. The energy received by the microbolometer array may comprise the full range of wavelengths discussed above (e.g., 0.38 to 1000 micrometers), or it may be limited to a subset of those wavelengths based on the spectral band selection received at step 320. In some embodiments, the subset of wavelengths may comprise two or more non-contiguous subsets of wavelength. The received energy may create changes in the temperature of particular microbolometer detectors which may impact the resistance of the respective microbolometer detector. The changes in resistance may cause changes in current or voltage associated with the individual detectors. The voltage or current changes may be the basis of the signal generated by the microbolometer array.

At step 340 an image is generated. The image may be generated based on the received signals generated at step 330. In some embodiments, the image generated at step 340 may include highlighting or other indications marking the objects which have been identified as objects of interest (for example at step 370). For example, the generated image may highlight near infrared pointers, laser designator illumination, eyesafe laser range finders, or camouflaged objects. In certain scenarios, the camouflaged object may be camouflaged for particular spectral bands. However, because the wideband detector is able to see a number of spectral bands, it is more likely that the wideband detector will detect the camouflaged object (as compared to a traditional microbolometer detector). The generated image, and any highlighting, may be sent to a display device for presentation to a user.

At step 350, a second spectral band selection is received. As with the first spectral band selection at step 320, the second spectral band selection may be made by mechanical means or by a processor. The second spectral band selection may filter a different plurality of spectral bands either greater or less than the first spectral band selection at step 320. In some scenarios, the second selection may be based on a potential new object of interest.

At step 360, a second image is generated. The generated second image may be based on the energy received by the microbolometer array. The received energy may depend on the spectral bands selected at step 350. In certain embodiments, the second spectral band may be selected based on information in the image generated at step 340. For example, if a processor detects a potential object of interest based on the spectral band selection made at step 320, a second spectral band selection may be made at step 350 to further assess the detected object. In particular embodiments, both the first and second images generated at steps 340 and 360, respectively, may be video images.

At step 370 an object of interest is identified. The object may be identified by a processor that is also configured to generate the image at steps 340 and 360. In certain embodiments the identified object of interest may be highlighted such that when it is presented to a user on a display device visible to the user, the user's attention is drawn to the identified object of interest. In some embodiments, the identified object of interest can be used in subsequent processing by other systems (e.g., targeting or alarm systems) using the multi-spectral information.

Although the steps depicted in FIG. 3 are arranged such that identifying the object of interest is the last step. This may not always be the case. In practice, objects of interest may be identified at any point during the method. Moreover, in many embodiments, the microbolometer may be exposed to a full range of spectral energy. That is, there may not be a spectral band selection made, or the spectral band selection may be to remove an optional or selectable bandpass window from the energy path. In certain embodiments, spectral band selections may be made in response to different factors including, but not limited to, identifying objects of interest. In such a scenario, step 370 may be performed after step 310 but before step 320.

One or more of the steps illustrated in FIG. 3 may be combined, modified, or deleted where appropriate, and additional steps may also be added to the flowchart. For example, while steps 320 and 350 depict receiving spectral band selections, other embodiments may include receiving a selection of a range of wavelengths instead of spectral bands. Additionally, the steps may be performed in any suitable order without departing from the scope of particular embodiments.

While various implementations and features are discussed with respect to multiple embodiments, it should be understood that such implementations and features may be combined, re-arranged, or modified in various embodiments. For example, features and functionality discussed with respect to a particular figure, such as FIG. 1, may be used in connection with features and functionality discussed with respect to another such figure, such as FIG. 2, according to operational needs or desires.

Although particular embodiments have been described in detail, it should be understood that various other changes, substitutions, and alterations may be made hereto without departing from the spirit and scope of particular embodiments. For example, although an embodiment has been described with reference to a number of elements included within wideband detector 100 such as optics, bandpass windows, wideband windows, microbolometer arrays, processors and displays, these elements may be combined, rearranged or positioned in order to accommodate particular detecting or imaging needs. In addition, any of these elements may be provided as separate external components to wideband detector 100 or each other where appropriate. Particular embodiments contemplate great flexibility in the arrangement of these elements as well as their internal components.

Numerous other changes, substitutions, variations, alterations and modifications may be ascertained by those skilled in the art and it is intended that particular embodiments encompass all such changes, substitutions, variations, alterations and modifications as falling within the spirit and scope of the appended claims.

What is claimed is:

1. An apparatus comprising:
   a microbolometer array comprising a two-dimensional array of microbolometer detectors configured to respond to energy having a first range of wavelengths comprising a first plurality of spectral bands;
   a wideband window configured to allow energy having a second range of wavelengths to reach the microbolometer array, the second range of wavelengths comprising at least the first plurality of spectral bands;
   optics configured to focus the energy from a scene through the wideband window and towards the microbolometer array;
   a plurality of selectable bandpass windows each configured to allow energy having a third range of wavelengths comprising at least one of the first plurality of spectral bands to reach the microbolometer array;
   a display device; and
   a processor configured to generate a first image based on a response of the microbolometer array to the energy having the first range of wavelengths, analyze the first image, based on analyzing the first image generate a spectral band selection identifying the at least one of the first plurality of spectral bands, and generate a control signal to select at least one bandpass window of the plurality of bandpass windows so as to spectrally discriminate the identified at least one of the first plurality of spectral bands, and to generate a second image for display on the display device based on a response of the microbolometer array to the energy that passes through the at least one bandpass window.

2. The apparatus of claim 1, wherein the at least one bandpass window is configured to spectrally discriminate the at least one of the first plurality of spectral bands based on a selection of the at least one of the first plurality of spectral bands, the selection of the at least one of the first plurality of spectral bands changing over time.

3. The apparatus of claim 1, wherein the at least one bandpass window is configured to be mechanically actuated by a user responsive to the control signal provided by the processor.

4. The apparatus of claim 1, wherein the first plurality of spectral bands comprises at least two spectral bands selected from the group consisting of visible wavelengths, near infrared wavelengths, short-wave infrared wavelengths, mid-wave infrared wavelengths, and long-wave infrared wavelengths.

5. The apparatus of claim 1, wherein the processor is further configured to detect a near infrared pointer.

6. The apparatus of claim 1, wherein the processor is further configured to detect laser designator illumination.

7. The apparatus of claim 1, wherein the processor is further configured to detect camouflaged object, the camouflaged object configured to be camouflaged to energy detectors configured to detect energy in a particular spectral band.

8. The apparatus of claim 1, wherein:
   the microbolometer array comprises a two-dimensional array of vanadium-oxide microbolometer detectors; and
   the wideband window comprises a sapphire wideband window.

9. The apparatus of claim 1, wherein the optics comprise reflective optics configured to pass different spectral bands along different optical paths.

10. The apparatus of claim 1, wherein the processor is further configured to generate a composite image for display on the display device based on a compilation of responses of the two-dimensional array of microbolometer detectors to the first range of wavelengths comprising the first plurality of spectral bands.

11. A method for multi-spectral imaging, comprising:
    exposing a microbolometer array comprising a two-dimensional array of microbolometer detectors to energy having a first range of wavelengths comprising a first plurality of spectral bands;
    generating, with a processor coupled to the microbolometer array, a first image based on a response of the microbolometer array to the energy having the first range of wavelengths;
    analyzing the first image with the processor;
    based on the analysis of the first image, generating with the processor a first spectral band selection identifying at least one spectral band from among the first plurality of spectral bands;
    exposing the microbolometer array to energy having a second range of wavelengths comprising the identified at least one spectral band based on the first spectral band selection; and
    generating a second image based on the response of the microbolometer array to the energy having the second range of wavelengths.

12. The method of claim 11, further comprising:
    analyzing the second image with the processor;
    based on analysis of the second image, generating with the processor a second spectral band selection identifying at least one other spectral band from among the first plurality of spectral bands, wherein at least one other identified spectral band is different from the at least one spectral band identified with the first spectral band selection;
    exposing the microbolometer array to energy having a third range of wavelengths comprising the identified at least one other spectral band based on the second spectral band selection; and
    generating a third image based on the response of the microbolometer array to the energy having the third range of wavelengths.

13. The method of claim 12, further comprising identifying a camouflaged object through comparison of the second and third images, the camouflaged object configured to be camouflaged to energy detectors configured to detect energy in a particular spectral band.

14. The method of claim 12, wherein analyzing the second image with the processor includes identifying an object in the second image.

15. The method of claim 11, wherein the first plurality of spectral bands comprises at least two spectral bands selected from the group consisting of visible wavelengths, near infrared wavelengths, short-wave infrared wavelengths, mid-wave infrared wavelengths, and long-wave infrared wavelengths.

16. The method of claim 11, further comprising identifying a near infrared pointer.

17. The method of claim 11, further comprising identifying laser designator illumination.

18. The method of claim 11, wherein analyzing the first image with the processor includes identifying an object in the first image.

* * * * *